Patented June 10, 1952

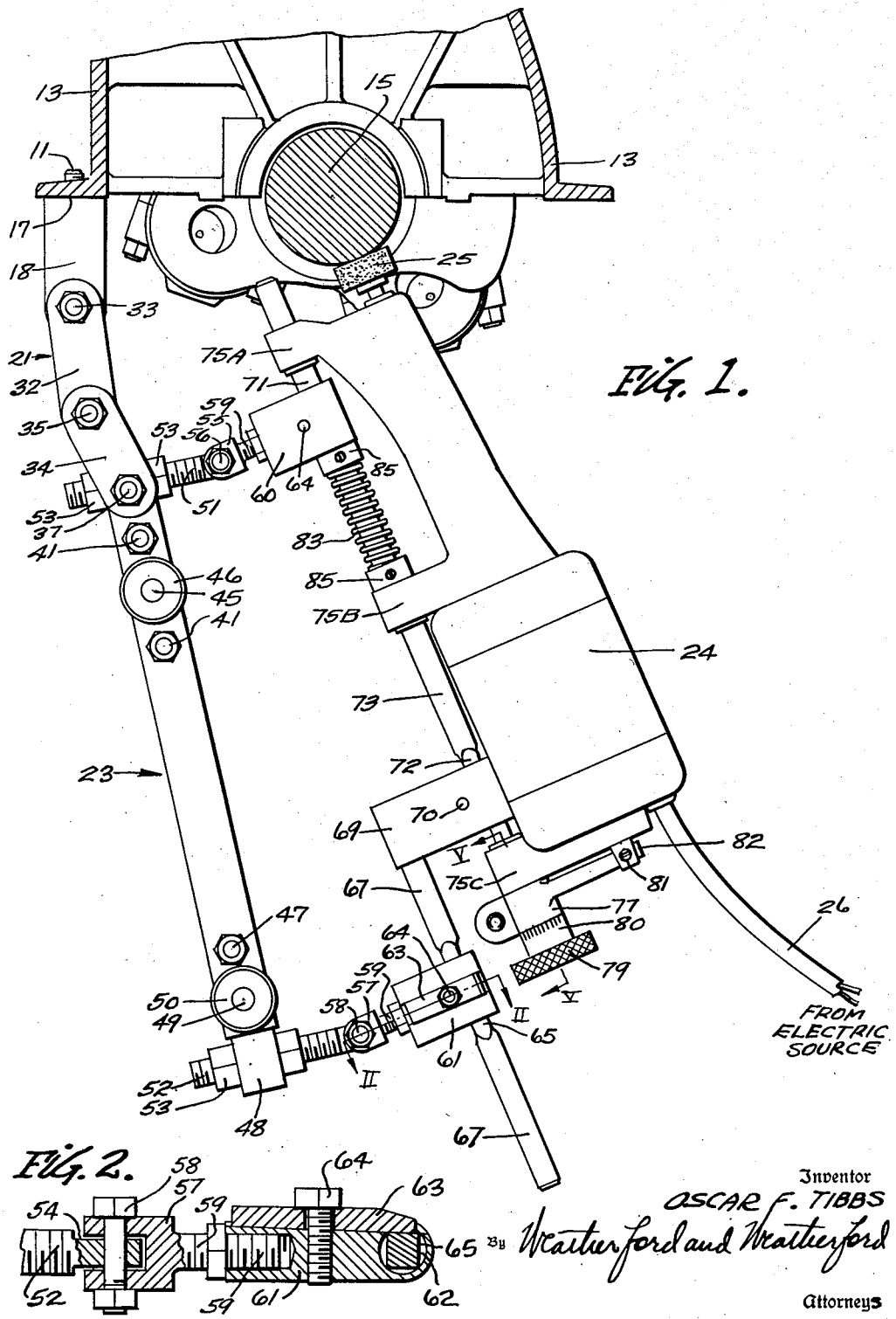

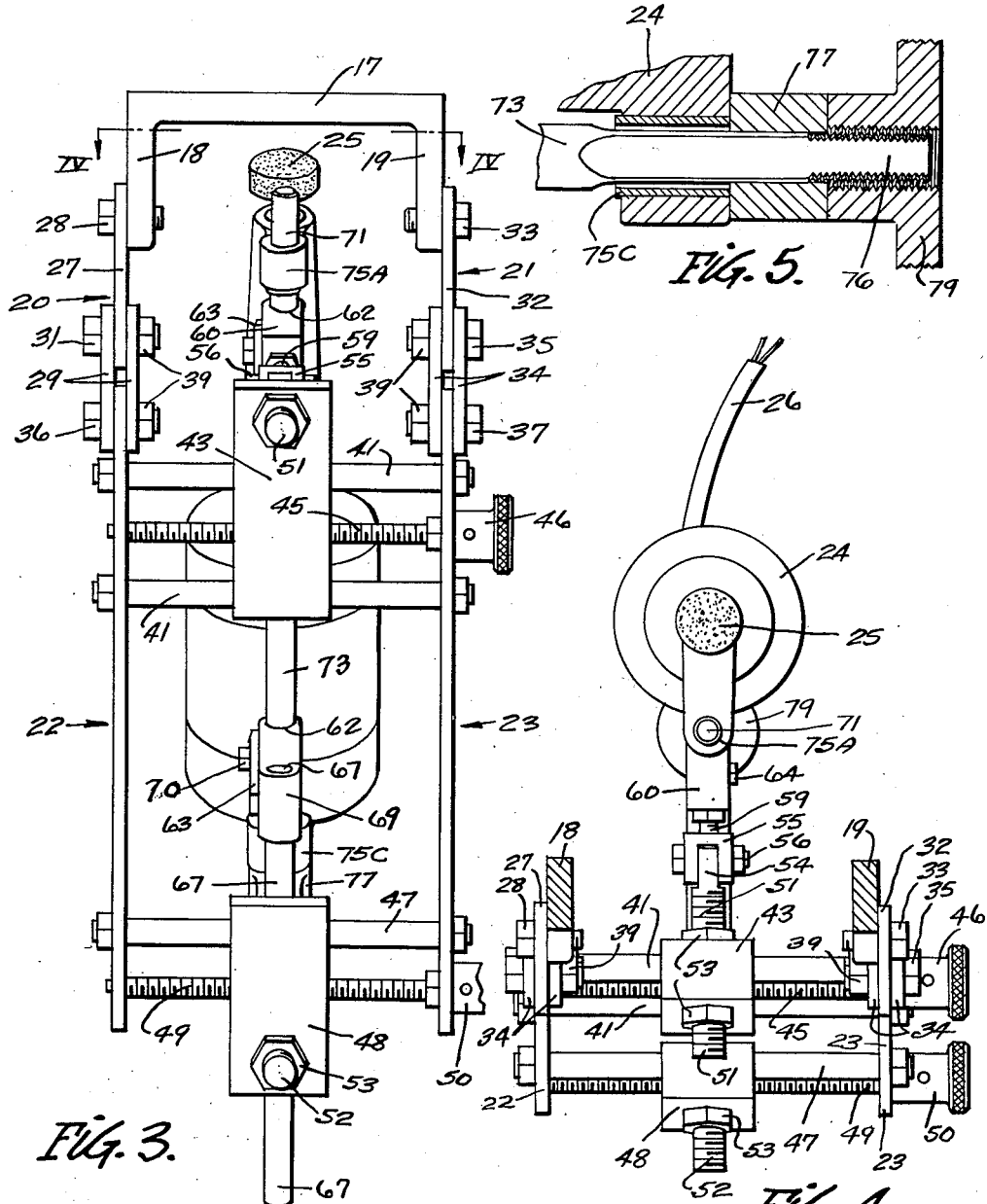

2,599,954

UNITED STATES PATENT OFFICE 2,599,954

SUPPORTING MEANS FOR BEARING GRINDERS

Oscar F. Tibbs, Memphis, Tenn., assignor of one-half to Emmet R. Garner, Sr., Memphis, Tenn.

Application November 23, 1951, Serial No. 257,705

6 Claims. (Cl. 51—241)

This invention relates to certain new and useful improvements in means for supporting bearing grinders, particularly of the type adapted to effect grinding of the main bearings of crank shafts, such as the crank shafts of automobiles, and it further relates to such supporting means which are adapted for adjustment to effect proper alinement of the grinder with the bearings to be processed and for retaining the grinder in such adjusted position.

It has heretofore been considered necessary in the majority of cases to remove automobile crank shafts from the engine in order to permit the bearings of same to be ground as needed. Although it has heretofore been contemplated that such grinding may take place with the crank shaft retained in the engine and without removal thereof, all known prior efforts for accomplishing such purpose have lacked proper means for effecting the delicate adjustment necessary to properly position the grinding face in grinding alinement with the bearings to be processed, and known devices for accomplishing such grinding have proven to be ineffective for accomplishing grinding of main bearings on such crank shafts.

The principal object of the present invention is to provide a support grinder means, particularly of the type adapted for grinding the main bearings of automotive crank shafts and to incorporate, with such support, means for adjusting the position of the grinder, both transversely and longitudinally of the axis of grinding rotation as well as angularly relative thereto, for centering same upon the main bearing.

A further object of the invention is to provide a support for a bearing grinder by which the grinding means may be accommodated for supporting attachment to the engine block or crank case and may be angularly adjusted relative to such supporting attachment in order to be properly alined with the crank shaft bearing.

A further object of the invention is to provide a support for a bearing grinder which may be attached to the crank case of conventional automobiles and in which adjustments may be made and fixed in the positioning of the grinder relative to the crank case in order to provide engagement between the grinder and the crank shaft bearing regardless of the variations in size and positioning of the crank case relative thereto.

A further object of the invention is to generally improve the design, utility and efficiency of means for supporting bearing grinders.

The means by which the foregoing and other objects of the present invention are accomplished and the manner of their accomplishment will be readily understood from the following specification upon reference to the accompanying drawings, in which:

Fig. 1 is a side elevational view of the supporting means of this invention illustrated as attached to an automobile crank case and supporting a bearing grinder in grinding engagement with the main bearing of the crank shaft.

Fig. 2 is a fragmentary sectional view on an enlarged scale taken as on the line II—II of Fig. 1.

Fig. 3 is a face view of the support means of the present invention, together with a bearing grinder supported thereon, seen as from the left side of Fig. 1; and Fig. 4 is an end view as on the line IV—IV of Fig. 3.

Fig. 5 is a fragmentary sectional view on an enlarged scale taken on the line V—V of Fig. 1.

Referring now to the drawings in which the various parts are indicated by numerals, the supporting means of the present invention is illustrated as attached by screw means 11 to a crank case 13 of a conventional automobile, crank case 13 housing a crank shaft having a main bearing 15. The support means of the present invention includes an attachment portion preferably consisting of a base member 17 suitably apertured to receive attachment means 11 by which the device is attached to the crank case. The base member 17 is solidly seated against the crank case with legs 18, 19 projecting from its opposite ends, base 17 and legs 18, 19, being integral and forming a bracket-like U-shaped element.

Attached to the free ends of legs 18, 19, by substantially identical toggle means 20, 21, hereinafter described, are the main support arms 22, 23, to which a grinder 24, having a grinding head 25, is attached, preferably in the manner hereinafter described, for purposes of support by the support means of this invention. Grinder 24 is a conventional member and is preferably powered from a suitable source of electrical power, not shown, through electrical lead 26. Toggle 20, by which support arm 22 is connected to bracket leg 18, preferably consists of a link 27 hingedly and clampably connected at one end as by a bolt 28 to the free end of leg 18 and having clampably hinged to its opposite end, as by pivot bolt 31, a pair of parallel links 29. Similarly toggle 21 consists of a link 32 clampably pivoted at one end as by a bolt 33 to leg 19 and having a pair of parallel links 34 clampably hinged to its opposite end as by a pivot bolt 35. It will be understood that while toggles 20, 21 are shown and described as incorporating respectively the parallel link pairs 29, 34, in some instances one link of the pairs of links may be omitted from either or both of the toggles without departing from the invention. The opposite ends of link pairs 29, 34 are pivotally and clampably connected, as by bolts 36, 37, respectively to the ends of the support arms 22, 23.

Thus it will be seen that the free ends of legs 18, 19, are coupled respectively to arms 22, 23, by toggles 20, 21, all of the connections being by clampable pivots to provide for relative adjustments between arms 22, 23 and the legs 18, 19. Preferably each of the bolts 28, 31, 33, 36, and 37, are provided with nuts 39, which may be tightened upon the respective bolts, so as to fix the pivotal connections in the desired position. If preferred, the legs and/or links may be provided with threaded apertures to receive and engage the respective bolts and thereby to effect, upon tightening of the bolts in the apertures, fixing of the links 27, 32 and link pins 29, 34 in adjusted position relative to legs 18, 19, and arms 22, 23.

Fixed to and extending in parallel relation perpendicularly between arms 22, 23 are slide bars 41, upon which is slidably mounted a block 43. Intermediate the slide bars 41, block 43 is provided with a threaded aperture parallel to the slide bars and engaged by a screw shaft 45, turnably mounted in arms 22, 23, in parallelism with the slide bars 41, and preferably being provided with a knob 46, by which screw shaft 45 may be conveniently rotated. It will be seen that upon rotation of screw shaft 45 block 43 is moved laterally between arms 22, 23, for purpose of adjustment of position.

Slide bars 41 and blocks 43 are mounted between arms 22, 23, adjacent the ends of those arms which are respectively attached to toggles 20, 21, as hereinabove described. Adjacent the opposite ends of and extending the distance between arms 22, 23, an additional and similar slide bar 47 is provided, upon which is mounted a block 48, similar to block 43, and being provided with a threaded aperture parallel to slide bar 47 and engaged by a screw shaft 49, journalled in arms 22, 23, and preferably provided with a convenient knob 50 for effecting rotation of screw shaft 49. Slide bar 47 is disposed parallel to slide bars 41.

Blocks 43, 48, preferably in their remote ends, are apertured at right angles to the slide bars and to arms 22, 23, to receive slidable and rotatable adjustment members 51, 52. It will be understood that if desired, blocks 43, 48, may be threaded to engage the adjustment members 51, 52, or, as shown, the adjustment members may be respectively provided with inner and outer nuts 53, by which fixing the members in adjusted position may be accomplished.

Each of the adjustment members 51, 52, at its inner end is preferably provided with a flattened portion as the portion 54 of member 52. To the flattened portion of member 51 a clevis 55 is clampably and rockably pivoted as by a bolt 56 and similarly to flattened portion 54 of member 52, a clevis 57 is connected as by a bolt 58. Clevises 55, 57 are each provided with a stem 59, which stems are threaded and rotatably engage threaded bores respectively formed in the bodies of lock units 60, 61. Each of the lock units 60, 61 is provided, remote from and at right angles to the stem-receiving bores, with an aperture 62, open along one side, and a clamp leaf 63, intersecting each aperture 62 across its open side and being removably, rockably and clampably attached to units 60, 61 respectively as by bolts 64.

Mounted in aperture 62 of lock unit 61 is a lock section 65 of a tail rod 67, lock section 65 being preferably squared and positioned for cooperative engagement by leaf 63 of lock unit 61, as best shown in Fig. 2. Spaced from lock section 65 an intermediate lock unit 69 is fixed to tail rod 67, lock unit 69 being preferably provided with an aperture 62 similar to aperture 62 of units 60, 61, and with a lock leaf similar to lock leaf 63, the leaf being fixed to lock unit 69 as by a suitable bolt 70. Aperture 62 of lock unit 69 is positioned in axial alinement with aperture 62 of lock unit 60. Lock units 60, 69 are spaced apart a substantial distance and tail and head lock sections 71, 72 of a thrust rod 73 are respectively mounted in apertures 62 of lock units 60, 69. Each of the lock sections is preferably squared to cooperate with leaves 63 of the lock units.

Grinder 24 is provided with head, intermediate, and tail journals respectively designated at 75A, 75B, 75C, which are turnably and slidably mounted upon thrust rod 73, the journals being so dimensioned and arranged as to position the axis of rotation of grinder head 25 in parallelism with thrust rod 73. It will be seen that head grinder journal 75A is positioned adjacent grinding head 25, intermediate grinder journal 75B is positioned intermediate head and tail lock sections 71, 72, and tail grinder journal 75C is positioned adjacent the opposite or tail end of grinder unit 24. The tail lock section 72 of thrust rod 73 adjacent the tail end thereof is threaded as at 76. Slidably mounted upon squared threaded section 76 of the thrust rod is a collar 77 which is adapted to engage squared section 76 and is thereby held against rotation relatively to thrust rod 73. Threadedly engaging the threads of thrust rod section 76 is an internally threaded knob 79 which is preferably provided with calibrations 80 and is adapted for advancement or retraction along threaded section 76 upon rotation. Collar 77 is interposed between calibrated knob 79 and tail grinder journal 75C. Grinder unit 24 is provided with a pair of spaced stops 81 projecting from the tail of the grinder and interposed between stops 81 is a finger 82 formed integrally with collar 77. Limited rocking movement of grinder unit 24 is provided by the travel of finger 82 between stops 81. Interposed between lock unit 60 and intermediate grinder unit 75B is a compression spring 83 provided with suitable seats 85 respectively bearing against lock unit 60 and grinder journal 75B. Spring 83 is adapted to interact with lock unit 60 and intermediate journal 75B to yieldingly resist movement of the grinder and head toward grinding position and to urge movement of the grinder and head away from grinding position.

In use of the device, after it has been assembled as hereinabove described, bracket base 17 may be fixed to crank case 13 and the position of arms 22, 23 longitudinally of the unit adjusted through adjustment of the toggles 20, 21 until the grinding head 25 is moved substantially into contact with main bearing 15. With this adjustment of position accomplished, toggle bolts 28, 31, 33, 35, 36, 37, are tightened clamping the respective pivotal connection in adjusted position and fixing arms 22, 23 relative to bracket leg 18, 19. It will be seen that due to the employment of toggles 20, 21, considerable variation in the spacing between crank case opening and the main bearing 15 may be accommodated through either the extension or folding of the respective toggles into the desired position, thus enabling the supporting means to be used with a great variety of kinds and types of crank cases.

Lateral adjustment of the grinder support may then be made through screw shafts 45, 49, screw shaft 45 being particularly adapted to laterally shift block 43 and thus effect shifting of the head of the grinder unit, primarily enabling the device to be centered upon the main bearing 15. After such adjustment has been made it is then desirable to effect adjustment of the tail of the grinder unit through shift of block 48 by screw shaft 49, thus in effect swinging the unit so as to aline the grinding head with the main bearing.

Further adjustment perpendicularly to the plane of arms 22, 23 is made through adjustment members 51, 52. These members may be fixed in adjusted position by tightening of nuts 53. Additional angular adjustment of position may be made by modifying the pivotal connection between clevises 55, 57, relative to the portion 54 of adjustment members 51, 52 and upon completion of such adjustment the pivot connections between the clevises and portions 54 fixed in position through bolts 56, 58. With the device thus adjusted as to position and with thrust rod 73 securely fixed to locks 60, 69, calibrated adjustment of the position of the grinder head longitudinally of the axis of the grinder and into grinding tangency with the main bearing 15 is effected by advancement of threaded knob 79 along threaded section 76 of the thrust rod. As the knob 79 is advanced along the threaded section collar 77 is abutted and is moved ahead of it, similarly moving tail grinder journal 75C and through that member effecting further movement of the grinder unit. This movement is resisted by spring 83 which prevents any accidental and undesired advancement of the grinder longitudinally of its axis and urges shift of the grinder away from such advancement. With the device thus positioned, the grinding operation as desired may be commenced.

In some instances it is desirable because of the arrangement of the crank case and related parts within which the work is to be accomplished to shift the entire grinder unit 24 arcuately relatively to arms 22, 23. Under conditions of this sort clevises 55, 57 are rotated from the position shown in Fig. 1, their respective pivotal connections through bolts 56, 58 being loosened sufficiently to permit pivoting of the clevises about the pivotal connections to adjustment member portions 54 and, when so shifted, reengagement of the pivotal clamps by tightening bolts 56, 58 will serve to maintain the device in adjusted position angular relative to arms 22, 23.

It will be seen that this adjustment may be made in a range substantially in excess of one hundred eighty degrees about the pivots 56, 58 and the attachment may be refixed by retightening of the bolts 56, 58 when properly adjusted position has been accomplished.

I claim:

1. Adjustable means for supporting a rotatable bearing grinder which comprise an attachment bracket having a pair of spaced projecting legs, a pair of similarly spaced arms, toggle means respectively interconnecting said legs with said arms adjacent one end of said arms, a block, means carried by said arms supporting said block for sliding movement transversely relative to said arms adjacent said one end of said arms, a screw shaft rotatably carried by said arms threadedly engaging said block to effect transverse movement of said block upon shaft rotation, a second block, means carried by said arms supporting said second block for sliding movement transversely relative to said arms adjacent the opposite ends of said arms, a second screw shaft rotatably carried by said arms and threadedly engaging said second block to effect transverse movement of said second block upon second shaft rotation, threaded adjustment means adjustably mounted in said blocks perpendicular to said arms and to said blocks, rotatable clevis means respectively pivoted to the projecting ends of said adjustment means, rod means attached to said grinder parallel to the axis of grinder rotation, and lock means, engaged by said clevis means, connected to said rod means, whereby to attach said grinder to said arms for adjustment relatively to said arms.

2. Adjustable means for supporting a rotatable bearing grinder which comprises an attachment bracket having a pair of spaced projecting legs, a pair of similarly spaced arms, toggle means respectively interconnecting said legs with said arms adjacent one end of said arms, block means, means carried by said arms supporting said block means for sliding movement transversely relative to said arms, screw shaft means rotatably carried by said arms threadedly engaging said block means to effect transverse movement of said block means upon shaft rotation, threaded adjustment means adjustably mounted in said block means perpendicular to said arms and to said block means, rotatable clevis means pivoted to said adjustment means, rod means attached to said grinder parallel to the axis of grinder rotation, and lock means, engaged by said clevis means, connected to said rod means, whereby to attach said grinder to said arms for adjustment relatively to said arms.

3. Adjustable means for supporting a rotatable bearing grinder which comprises an attachment bracket having a pair of spaced projecting legs, a pair of similarly spaced arms, toggle means respectively interconnecting said legs with said arms adjacent one end of said arms, block means, means carried by said arms supporting said block means for sliding movement transversely relative to said arms, means for effecting transverse movement of said block, threaded adjustment means adjustably mounted in said block means perpendicular to said arms and to said block means, rod means attached to said grinder parallel to the axis of grinder rotation, and lock means, coupled to said adjustment means and connected to said rod means, whereby to attach said grinder to said arms for adjustment relatively to said arms.

4. In a support for a bearing grinder which includes an attachment bracket adapted for attachment to an automobile crank case, support arms coupled to said bracket, and means for adjusting the position of a supported grinder transversely relative to said arms, threaded adjustment members engaging and carried by said adjustment means and disposed perpendicularly to said arms and to said adjustment means, clevis means clampably pivoted to said adjustment members, means coupling said clevis means to said grinder, said adjustment members being shiftable to effect adjustment of grinder position perpendicularly relative to said arms, means for fixing said adjustment members in adjusted position, said clevis means being pivotally adjustable relative to said threaded adjustment members to effect shift of said grinder longitudinally relative to said arms, and means for incrementally longitudinally advancing and retracting said grinder.

5. In a support for a bearing grinder which includes an attachment bracket adapted for attachment to an automobile crank case, support arms coupled to said bracket, and means for adjusting the position of a supported grinder transversely relative to said arms, threaded adjustment members engaging and carried by said adjustment means and disposed perpendicularly to said arms and to said adjustment means, means coupling said adjustment members to said grinder, said adjustment members being shiftable to effect adjustment of grinder position perpendicularly relative to said arms, means for fixing said adjustment members in adjusted position, and means for incrementally longitudinally advancing and retracting said grinder.

6. In a support for a bearing grinder which includes an attachment bracket adapted for attachment to an automobile crank case, support arms coupled to said bracket, and means for adjusting the position of a supported grinder transversely relative to said arms, threaded adjustment members engaging and carried by said adjustment means and disposed perpendicularly to said arms and to said adjustment means, means coupling said threaded adjustment members to said grinder, said adjustment members being shiftable to effect adjustment of grinder position perpendicularly relative to said arms, and means for fixing said adjustment members in adjusted position.

OSCAR F. TIBBS.

No references cited.